(12) United States Patent
Ferreira et al.

(10) Patent No.: US 12,130,713 B2
(45) Date of Patent: Oct. 29, 2024

(54) AUTONOMOUS ORGANIZATION AND ROLE SELECTION OF HOMOGENOUS WORKERS

(71) Applicant: Advanced Micro Devices, Inc., Santa Clara, CA (US)

(72) Inventors: Ian Ferreira, Issaquah, WA (US); Max Alt, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 37 days.

(21) Appl. No.: 17/583,737

(22) Filed: Jan. 25, 2022

(65) Prior Publication Data

US 2022/0237090 A1    Jul. 28, 2022

Related U.S. Application Data

(60) Provisional application No. 63/141,319, filed on Jan. 25, 2021.

(51) Int. Cl.
*G06F 11/00* (2006.01)
*G06F 11/14* (2006.01)
*H04L 67/00* (2022.01)
*H04L 67/104* (2022.01)

(52) U.S. Cl.
CPC ...... *G06F 11/1492* (2013.01); *G06F 11/1441* (2013.01); *H04L 67/1048* (2013.01); *H04L 67/34* (2013.01)

(58) Field of Classification Search
CPC ............. G06F 11/1492; G06F 11/1441; H04L 67/1048; H04L 67/34
See application file for complete search history.

(56) References Cited

U.S. PATENT DOCUMENTS

| | | | | |
|---|---|---|---|---|
| 6,014,686 A | * | 1/2000 | Elnozahy | G06F 9/547 709/224 |
| 8,645,429 B1 | * | 2/2014 | Bik | G06F 15/17312 707/808 |
| 10,275,326 B1 | * | 4/2019 | Stickle | G06F 11/0751 |
| 11,016,939 B2 | * | 5/2021 | Lu | G06F 16/1748 |
| 11,119,872 B1 | * | 9/2021 | Jacobson | G06F 11/202 |
| 11,520,593 B1 | * | 12/2022 | Zhang | G06F 11/076 |
| 11,593,118 B2 | * | 2/2023 | Singhal | G06F 9/4403 |
| 2002/0138156 A1 | * | 9/2002 | Wong | G06F 9/4405 700/8 |

(Continued)

*Primary Examiner* — Loan L. T. Truong
(74) *Attorney, Agent, or Firm* — Fishman Stewart PLLC (57) ABSTRACT

A method for configuring replicas in a distributed computing system is disclosed. In one example embodiment, a plurality of replicas with associated bootstrap modules may be created. The same bootstrap module code may be used for each replica, thereby simplifying configuration. Using the bootstrap module, the replicas may automatically configure themselves and self-assign a role for a set of predetermined roles such as master and worker. The bootstrap module may check a predetermined location such as a shared network folder for earlier registration entries and then self-select based on the remaining available roles. The bootstrap module may also store its own registration entry to inform subsequent replicas of the role and network address for the current replica so that they may self-configure correctly.

20 Claims, 5 Drawing Sheets

(56) References Cited

U.S. PATENT DOCUMENTS

| | | |
|---|---|---|
| 2003/0149735 A1* | 8/2003 | Stark .................... H04L 9/40 |
| | | 714/4.11 |
| 2010/0146512 A1 | 6/2010 | Chen et al. |
| 2016/0050123 A1* | 2/2016 | Nishanov ............... H04L 67/10 |
| | | 709/223 |
| 2016/0050262 A1* | 2/2016 | Kumar ............... H04L 43/0823 |
| | | 709/204 |
| 2018/0095855 A1* | 4/2018 | Sanakkayala ......... G06F 11/203 |
| 2018/0136979 A1* | 5/2018 | Morris ............... H04L 67/1097 |
| 2019/0370371 A1* | 12/2019 | Lam ..................... G06F 16/27 |
| 2020/0344123 A1 | 10/2020 | Prendergast et al. |
| 2020/0351158 A1* | 11/2020 | Krivenok ............ H04L 67/1097 |
| 2021/0255876 A1* | 8/2021 | Puhan ................. H04L 67/1061 |
| 2021/0271489 A1* | 9/2021 | Singhal ..................... G06F 8/63 |
| 2023/0113718 A1* | 4/2023 | Khanna .............. H04L 67/1044 |
| | | 700/276 |
| 2023/0153162 A1* | 5/2023 | Baillargeon .......... G06F 9/5044 |
| | | 718/104 |

* cited by examiner

AUTONOMOUS ORGANIZATION AND ROLE SELECTION OF HOMOGENOUS WORKERS

CROSS-REFERENCE TO RELATED APPLICATION

This application claims the benefit of U.S. Provisional Patent Application Ser. No. 63/141,319, filed on Jan. 25, 2021, the disclosure of which is hereby incorporated by reference in its entirety as though fully set forth herein.

TECHNICAL FIELD

The present disclosure generally relates to configuring computing systems such as distributed computing systems with multiple replicas and roles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing tasks (often called workloads) such as machine learning (ML), artificial intelligence (AI), data mining, and scientific simulation frequently require large amounts of computing resources, including storage, memory, and computing power. As the time required for a single system or processor to complete many of these tasks would be too great, they are typically divided into many smaller tasks that are distributed to large numbers of computing devices or processors such as central processing units (CPUs) or graphics processing units (GPUs) within one or more computing devices (called nodes) that work in parallel to complete them more quickly. Specialized computing systems (often called clusters) have been built that offer large numbers of nodes that work in parallel and that are designed to complete these tasks more quickly and efficiently. Clusters can have different topologies (i.e., how compute resources are interconnected within a node or over multiple nodes). Groups of these specialized computing systems can be used together (both locally and remotely) to create large and complex distributed systems able to handle highly complex computational workloads.

Properly setting up and configuring these computing systems can be difficult and time consuming for users. A typical end user may be a data scientist or artificial intelligence or machine learning specialist, not a dev ops engineer specializing in deployment. Unlike the simple process of downloading and installing an app on a phone or PC, in distributed computing systems the process is much more complex and time consuming. To run a machine learning experiment, a data scientist may have to first configure multiple different system parameters on many different application replicas, including memory allocations, network connections, and storage. Some application replicas may be containerized or virtualized into separate parts, each requiring a potentially different configuration. For example, one common artificial intelligence/machine learning pattern is distributed training, which can have many different replicas of several different types (called roles). For example, some containers may operate as Masters, and others as Workers performing tasks as assigned by the Master. One or more containers may also be designated as Parameter servers that are configured to store model parameters and coordinate shared model state between the workers, while others may be configured as Evaluators that evaluate the model. Different applications and implementations will have different requirements and or limits for these roles.

Installation and configuration of these application replicas can be a complex and time-consuming process, particularly for systems with large numbers of replicas. For example, a user might have to create a replica in a pod and container, assign a manager role, create another set of replicas in pods and containers and assign them worker roles, then point the workers to the manager so they can communicate, then create a container and assign it a parameter server role, and so on.

For at least these reasons, there is a desire for an improved method for efficiently creating and managing application instances in computing systems. The foregoing discussion is intended only to illustrate examples of the present field and is not a disavowal of scope.

SUMMARY

A method for self-configuring elements in a computing system is contemplated. In some embodiments, the system may self-bootstrap and self-organize multiple replicas (e.g., in containers or virtual machines) into a multi-role structure meeting predetermined criterion (e.g., only one master, at least three workers, only one parameter server, and multiple evaluators). Quantity-limited roles such as manager roles may be automatically self-configured without requiring the user's input or configuration, and roles with multiple instances such as worker roles may be automatically configured to connect to the appropriate manager. Roles may be autonomously selected based on configuration metadata the user (or a system admin) has preconfigured based on the application being executed. By having each application instance (e.g., replica) running the same bootstrap module code (e.g., shell scripts in pods, containers, or virtual machines), set-up and configuration may be greatly simplified.

In one example embodiment, the method may comprise creating a plurality of replicas and a plurality of bootstrap modules. In some embodiments the same bootstrap module code (e.g., shell script configured to run on start-up) may be used for each replica, thereby simplifying configuration as each replica may automatically self-assign a role. For example, each of the plurality of bootstrap modules may be the same, regardless of which role the bootstrap module's associated replica is to be configured to. Each bootstrap module may be associated with one of the replicas and may be configured to store a registration entry to a predetermined location such as a shared network location or folder (e.g., with a name based on a per-job GUID associated with the application job being executed). The bootstrap module may also check the predetermined location for other earlier-stored registration entries. In response to detecting more than a predetermined number of earlier-stored registration entries (e.g., more than zero), the bootstrap module may configure the associated replica into a first role (e.g., worker). In response to not detecting more than the predetermined number of earlier-stored registration entries (e.g., detecting zero earlier entries), the bootstrap module may be confident that it is the first and may configure the associated replica into a second role (e.g., master). The bootstrap module may store its registration entry in a predetermined format. For example, in some embodiments the registration entry may be a semaphore or a text file that is stored to the predetermined location, or it may be one or more metadata fields stored to a predetermined database that the bootstrap module can access upon start-up. The registration entry may comprise, for example, metadata such as the network address (e.g., IP address) of the replica associated with the bootstrap module. In some embodiments, the registration entry may be stored to a different location based on the role that the bootstrap module configures its replica to (e.g., a master sublocation such as a subfolder or subdirectory within the predetermined location if the replica will be a master, a worker sublocation if the replica will be a worker, etc.).

In embodiments where there are multiple roles with different numerical limits (e.g., one master, eight workers, three parameter servers, and eight evaluators per parameter server), the metadata for which roles are defined and which numerical limits (if any) apply to those roles may for example be stored as part of the bootstrap modules or in the predetermined location, and the bootstrap modules may be configured to check the predetermined location (and associated subfolders, depending on the implementation) for the metadata. Based on that metadata, the bootstrap module may be configured to check for earlier registration entries stored from each of the roles to determine which role to use when configuring its replica. For example, if the metadata indicates one master, eight workers, three parameter server, and eight evaluators per parameter server, and there are already nine registration entries (e.g., one in a master subfolder and eight in a worker subfolder), based on the metadata and the other existing (earlier) registration entries, the bootstrap module may configure its associated replica to be a parameter server and store its registration entry into a parameter server subfolder.

In some embodiments, policy information may also be stored to the predetermined location (or within the bootstrap module). For example, the policy may instruct the bootstrap module to configure its replica to launch and wait for a predetermined number of workers before starting work, or it may instruct the bootstrap module to configure its replica to launch and start work as soon as ready without waiting.

In some embodiments, the bootstrap modules may configure their associated replicas with network address information for other replicas based on the registration entries stored at the predetermined location (and associated subfolders, if any). For example, the address of a master may be read and then used by the bootstrap module of a replica being configured as a worker to set up communication (e.g., ssh, ssl, vpn) between the different replicas.

In some embodiments, the status of the system may be monitored, and the system may be automatically reset when predetermined conditions are met. For example, if a critical number of replicas become non-responsive, the registration entries may be cleared from the predetermined location, the replicas may be reset, and the bootstrap modules may automatically begin the self-configuration process anew. Based on timing, replicas may assume different roles after each reset. Beneficially, if a master replica fails, a new master may be self-selected after reset without the user having to manually reconfigure the system.

In another embodiment, the method may comprise creating a plurality of bootstrap modules each associated with a replica. The bootstrap modules may be configured to auto-execute on startup, read configuration metadata from a predetermined location, check for registration entries indicating that other bootstrap modules have already filled a predetermined maximum number of one or more roles, and in response to detecting that a role is still available, creating a registration entry for the available role and configuring the associated replica for the available role.

While the examples above have focused on compute-based examples with replicas for masters, workers, parameter servers and evaluators, virtual machines and native code modules may be used in place of containers in some embodiments, and the systems and methods described herein may also be used for storage instead of, or in addition to, compute. Based on the particular embodiment, the bootstrap module may be implemented in a script, batch file, or executable application and may be run in or in connection with a replica in a pod, container, virtual machine or on bare metal.

In some embodiments, these methods may be implemented in software (e.g., as instructions stored on a computer-readable medium that when executed by a processor cause the processor to perform the methods described above) or hardware.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
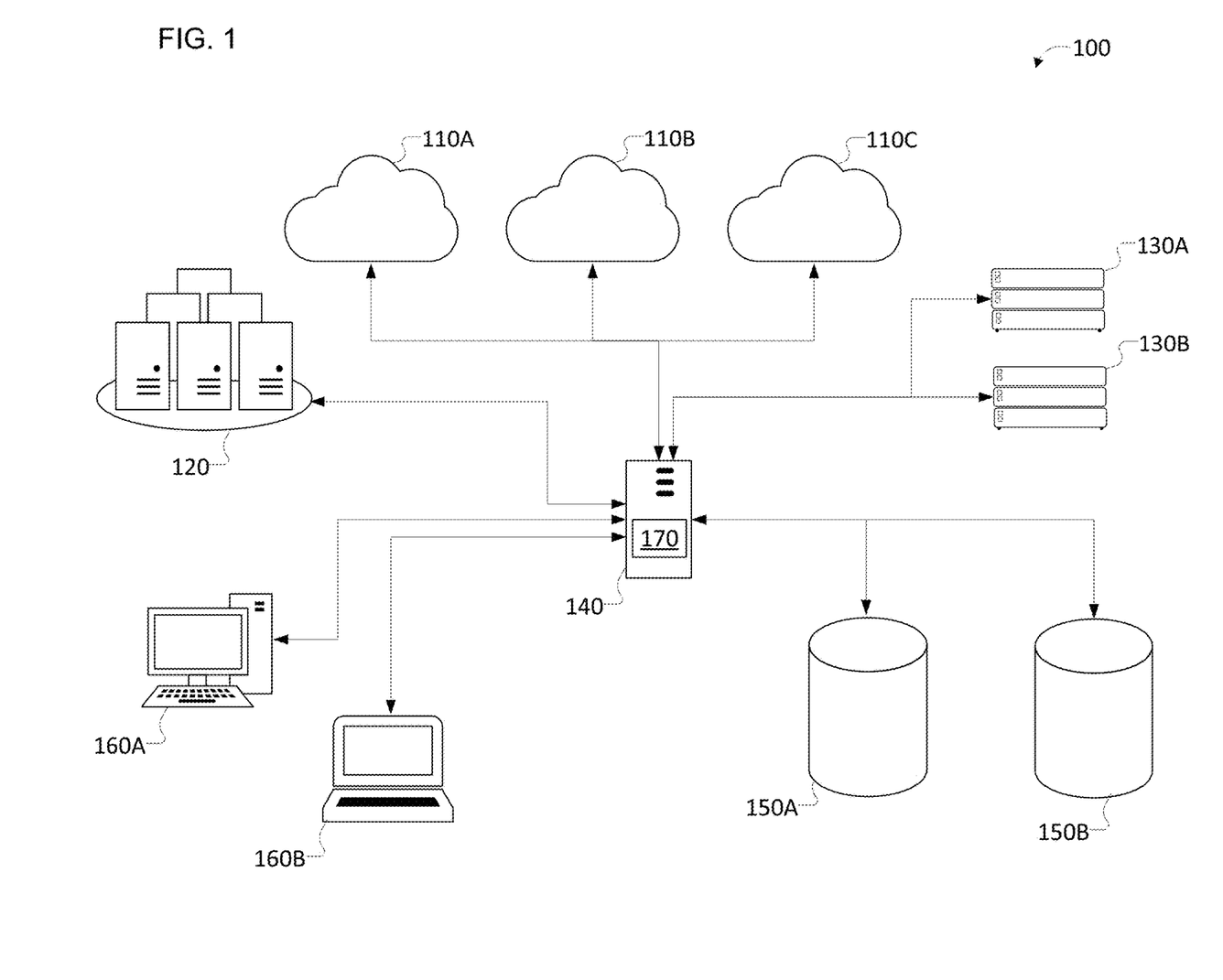
FIG. 1 is a schematic view generally illustrating an example embodiment of a distributed computing system according to teachings of the present disclosure.

Turning now to FIG. 1, an example embodiment of a distributed computing system 100 according to teachings of the present disclosure is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their on-premises network-connected PCs, workstations, or servers (160A) and laptop or mobile devices (160B) via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a datacenter 120 including for example one or more supercomputers or high-performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages. The program code may execute entirely on the server 140, partly on server 140 and partly on other computing devices in distributed computing system 100.

The management application 170 may be configured to provide an interface to users (e.g., via a web application, portal, API server or command line interface) that permits users and administrators to submit applications/jobs via their devices/workstations 160A and laptop or mobile devices 160B, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, one or more nodes within a cluster (e.g., running with a virtual machine or container). Management server 140 may be configured with one or more processors (physical or virtual), volatile memory, and non-volatile memory such as flash storage or internal or external hard disk (e.g., network attached storage accessible to server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be configured to run within containers (e.g., Kubernetes with Docker containers, or Singularity) or virtualized machines on the distributed computing system 100. Kubernetes is an open-source system for automating deployment, scaling, and management of containerized applications. Singularity is a container platform popular for high performance workloads such as artificial intelligence and machine learning.

Figure 2:
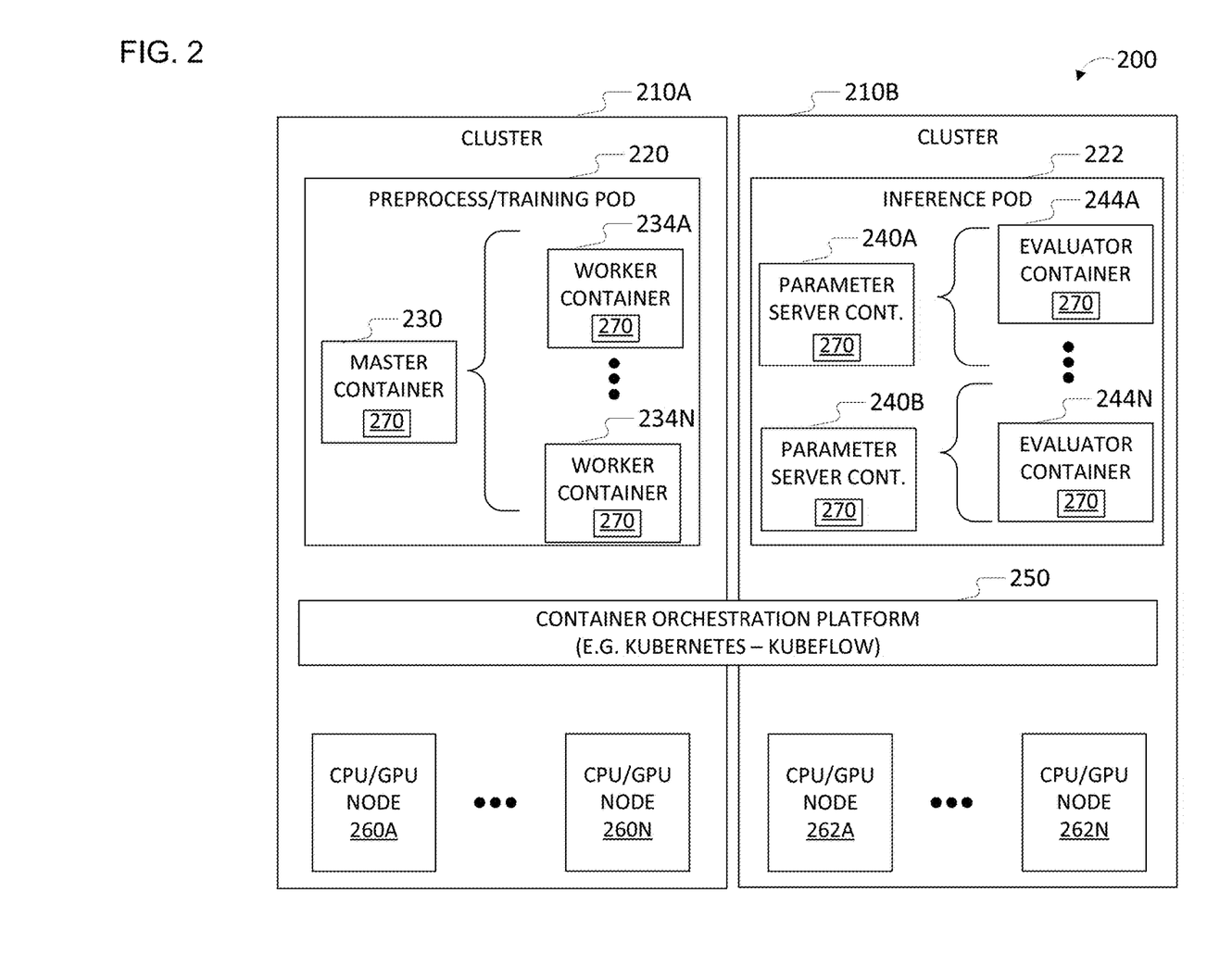
FIG. 2 is a schematic view generally illustrating another example embodiment of a distributed computing system according to teachings of the present disclosure.

Turning now to FIG. 2, a schematic view generally illustrating another example embodiment of a distributed computing system 200 according to teachings of the present disclosure is shown. In this embodiment, the system comprises one or more clusters 210A-B. Each cluster is capable of executing one or more pods 220-222, and each pod 220-222 is capable of executing one or more containers, such as containers 230, 234A-N, 240A-B, and 244A-N. The containers are managed by a container orchestration platform 250 (such as Kubernetes or Kubeflow) which allocates resources from one or more nodes, such as compute nodes 260A-N and 262A-N. The container orchestration platform 250 may allocate and schedule the pods/containers to resources including compute nodes (e.g., CPU/GPU), storage nodes, I/O, etc. The resources and nodes may be part of multiple clusters 210A-B, and they may be distributed across different physical systems (e.g., different servers) and physical locations.

In this example, a user has specified a particular application to run that has multiple components with multiple roles, including master and worker (used in this example for preprocessing and training within pod 220), and parameter server and evaluator (used in this example for performing inference, a common task in artificial intelligence and machine learning, within pod 222). This is merely one example, and other configurations are possible and contemplated (e.g., each container could be in its own pod). In this example, the worker containers 234A-N are managed by master container 230, and the evaluator containers 244A-N are managed by parameter servers 240A-B, respectively. In some embodiments, each container may be configured with a bootstrap module 270 that configures the container. In other embodiments, the bootstrap module 270 may be part of the pod rather than the container. In yet other embodiments, the bootstrap module may be part of both pods and containers, or there may be a pod bootstrap module and a container bootstrap module. In some embodiments, bootstrap module 270 may for example be implemented as a set of shell scripts that are configured to automatically run when the container or pod is started.

Figure 3:
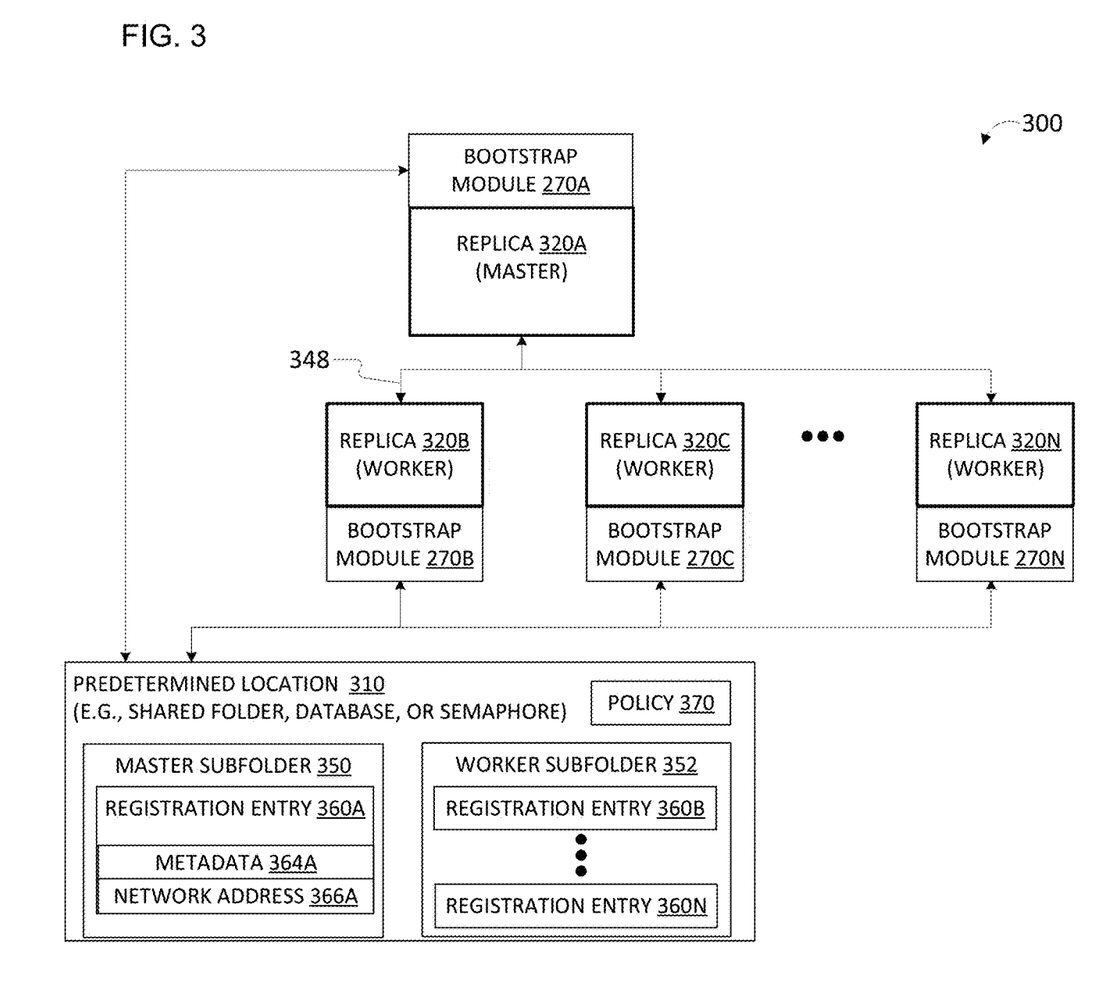
FIG. 3 is a schematic view generally illustrating yet another example embodiment of a distributed computing system according to teachings of the present disclosure.

Turning now to FIG. 3, a schematic view generally illustrating yet another example embodiment of a system and method 300 for configuring a computing system according to teachings of the present disclosure is shown. In this embodiment, a number of replicas 320A-N are created along with a corresponding set of bootstrap modules 270A-N. Each bootstrap module 270A-N is configured to automatically run at start-up and read configuration information from a predetermined location 310. In some embodiments, bootstrap modules 270A-N may be copies of the same or substantially the same code. In some embodiments, the predetermined location 310 may be a shared network folder, a database, or a website or webservice (e.g., implementing a semaphore for the role of master).

The bootstrap modules 270A-N may be configured to read configuration information from predetermined location 310 such as registration entries 360A-N. In some embodiments, these registration entries may be stored in subfolders 350-352 according to role. For example, if bootstrap module 270A is the first to reach predetermined location 310 and no registration entries are stored therein, bootstrap module 270A may be configured to store a registration entry 360A into master role subfolder 350 to indicate that its associated replica 320A will be configured as a master. The registration information may for example include information such as any metadata 364A that may be used by subsequent bootstrap modules to configure their replicas in worker roles and connect to master role replica 320A, including for example the master role replica's network address (e.g., IP address), and keys (e.g., public keys) for establishing secure communication channels 348 between the master replica 320A and the worker replicas 320B-320N).

In some embodiments, predetermined location 310 may be a unique network folder (or a common folder with unique subfolders) named based on a GUID (e.g., per-job GUID) corresponding to the particular application job that the system is being configured to execute, thereby permitting many different jobs and sets of replicas to be created in parallel in the same distributed computing system. File systems have lock functions to prevent file overwriting, and those lock functions may be used to ensure that one replica does not overwrite another's registration entry as it is being written.

Continuing the example above, once bootstrap module 270A has stored registration entry 360A into master role subfolder 350, a subsequent bootstrap module 270B accessing predetermined location 310 will see registration entry 360A and in response move on and create a registration entry 360B in worker subfolder 352 and begin configuring replica 320B in the worker role. Bootstrap modules 270B-N may also read metadata 364A and network address 366A from registration entry 360A and configure communications between the worker replicas 320B-N and master replica 320A accordingly. Alternatively, or in addition, bootstrap module 270A and or master replica 320A may monitor predetermined location 310 and read registration entries 360B-N (and their corresponding metadata and network address information) to configured communication channels 348 from the master role replica to the work role replicas.

In some embodiments, bootstrap modules 270A-N may also be configured to read stored policy information 370 from predetermined location 310 for additional information to be used in configuring the replicas. For example, policy information 370 might indicate that manager replicas need to wait until at least three worker replicas are ready before starting. Other policies may for example specify all replicas should start as soon as the manager is ready, regardless of the number of available workers.

In some embodiments, changes in the mesh of replicas for a particular job may be monitored to detect problems (e.g., a master pod, container, replica or node fails or malfunctions, or more than a predetermined critical number of worker pods, containers, replicas or nodes fail or malfunction). In response, the corresponding entries in the predetermined location 310 may be deleted and the replicas reset, thereby automatically reinitialize the self-configuration process.

Figure 4:
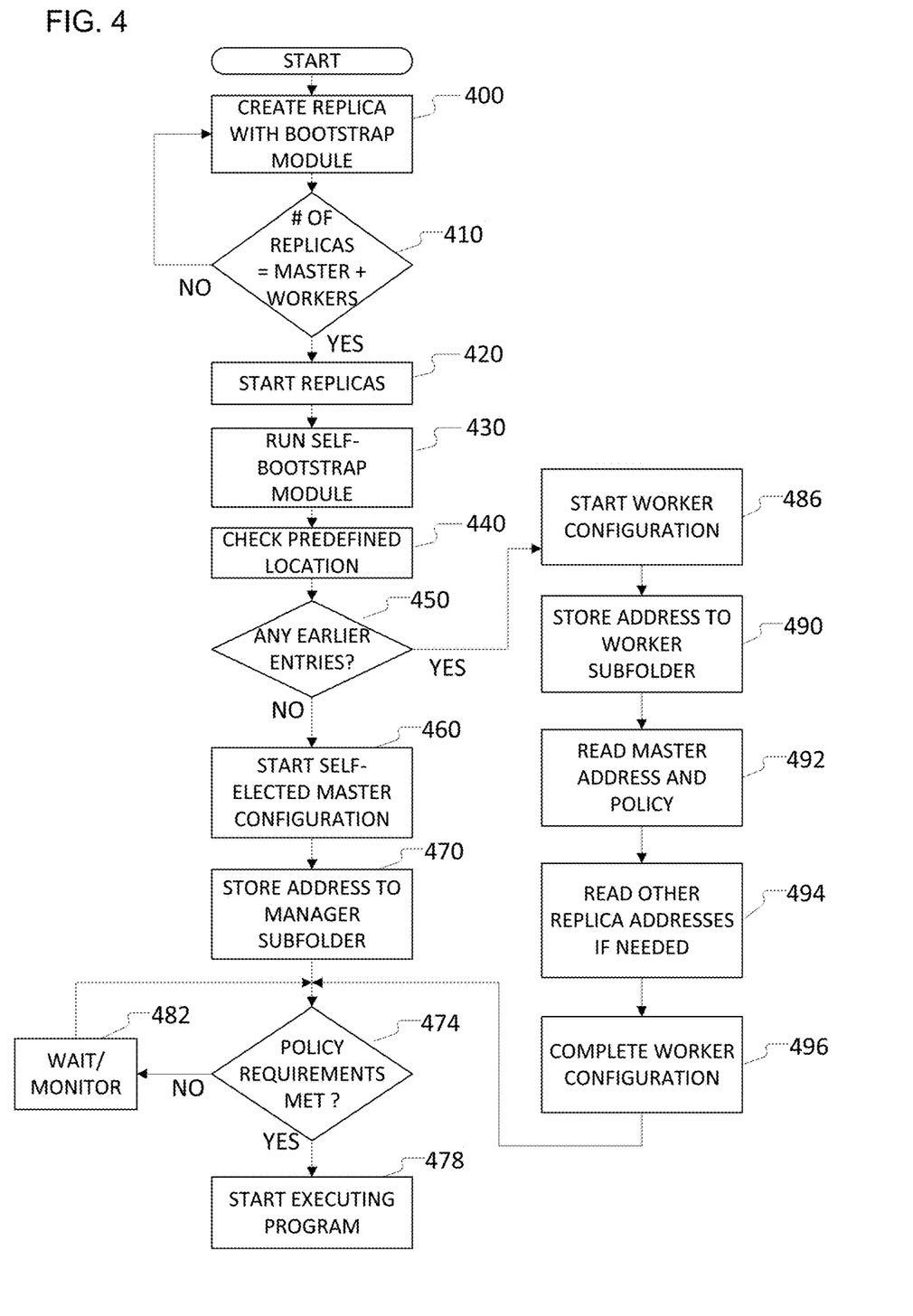
FIG. 4 is a flow diagram view generally illustrating an example of a method for configuring a computing system according to the teachings of the present disclosure.

Turning now to FIG. 4, a flow diagram view generally illustrating an example of a method for configuring a computing system according to the teachings of the present disclosure is shown. In this embodiment, there are two roles (master and worker), but more roles are possible and contemplated. Replicas are created (e.g., containers or virtual machines are created and populated) until the total number of replicas matches the total number needed, with each replica having an associated bootstrap module (steps 400 and 410). The number of replicas created may equal the total number of replicas needed. For example, if the application requires one master and four workers, a total of five replicas would be created. As each replica starts (step 420), the associated bootstrap module is run (step 430) and a predetermined location is checked (step 440) for any stored policies and earlier registration entries (step 450).

If there are no earlier registration entries, that indicates that no other replica has yet configured themselves in a master role, so the bootstrap module may start configuring its associated replica as a self-elected master (step 460). The bootstrap module may also store a registration entry for its corresponding replica (step 470) to the predetermined location (e.g., in a master subfolder). The registration entry may include, for example, the network address (e.g., IP address) of the corresponding replica and other configuration information needed by subsequent bootstrap modules to configure their corresponding replicas as workers for the self-elected master replica. For example, this may also include public keys that may be used to establish secure communication channels (e.g., ssh, SSL, VPN) between the master and workers.

Once configuration of the replica is completed, the bootstrap module may check whether any policy requirements (e.g., as read from the predetermined location) have been met (step 474). For example, if the policy requires all master and workers (e.g., one master and four workers) to be configured and ready before execution begins, the replica may wait (step 482) until such conditions are met before starting execution of the application program (step 478) in the master and worker replicas. This may entail monitoring the predetermined location for the requisite number of registration entries or waiting for the appropriate number of worker replicas to contact the master replica and complete establishment of secure network channels for communications.

If there are one or more earlier registration entries at the predetermined location (step 450), the bootstrap module may start configuring the replica for the worker role (step 486) and store its own registration entry to the predetermined location as a worker, e.g., in a worker sublocation/subfolder/subdirectory (step 490). The bootstrap module may also read the earlier registration entries to determine the master replica's network address and any applicable policy requirements for the worker replicas (step 492). Other replica addresses, keys, and other configuration information needed may also be read (step 494) to enable the bootstrap module to complete configuration of the worker replica (step 496). Once all applicable policy requirements are met (step 474), the worker replica may start executing the application program in the worker role.

Figure 5:
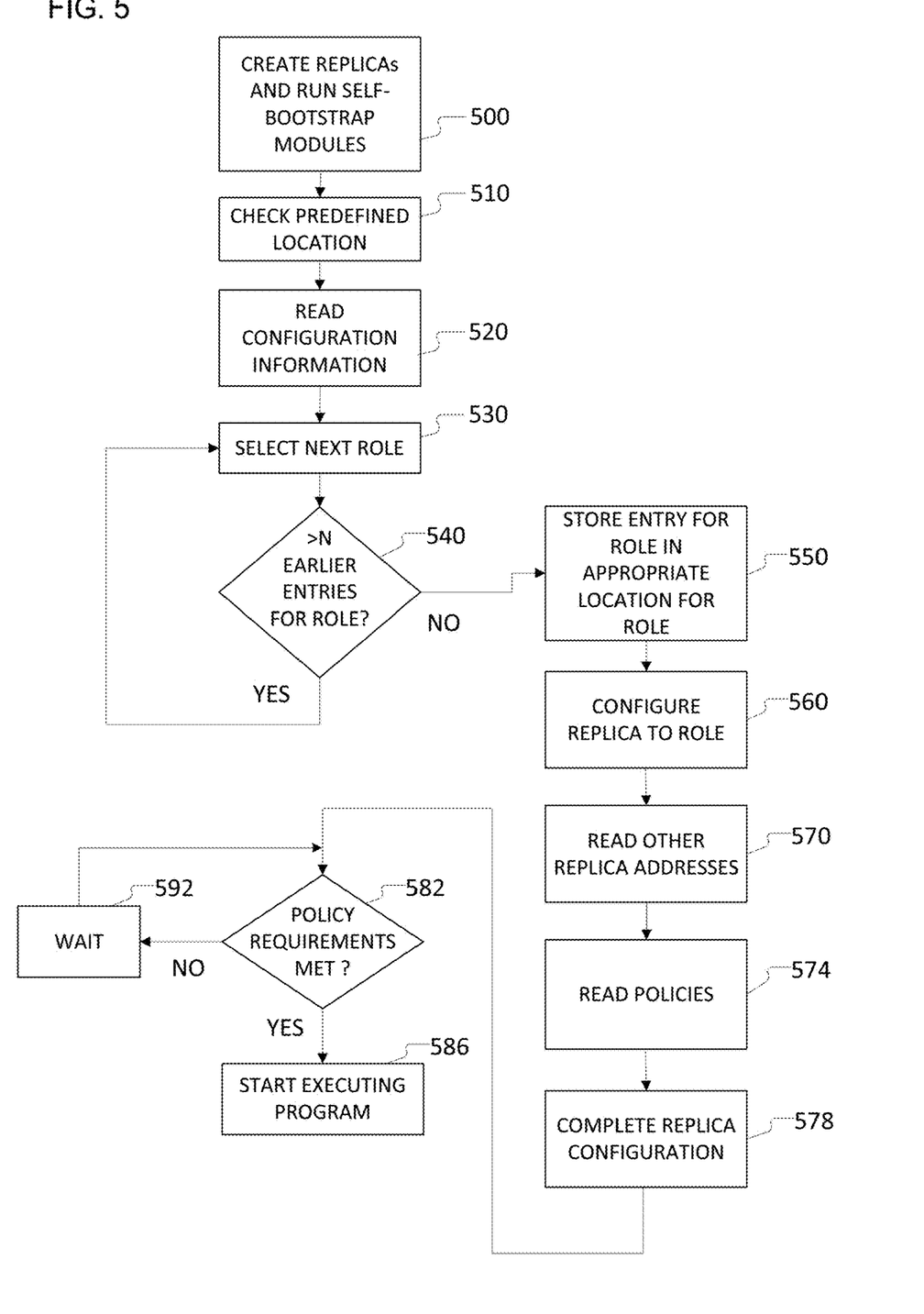
FIG. 5 is a flow diagram view generally illustrating another example of a method for configuring a computing system according to the teachings of the present disclosure.

Turning now to FIG. 5, a flow diagram view generally illustrating another example of a method for configuring a computing system according to the teachings of the present disclosure is shown. In this example embodiment, more than two roles are implemented. A set of replicas and associated bootstrap modules are created (step 500), and the bootstrap modules read the predetermined location (e.g., by querying a database or reading a predetermined shared network directory) (step 510). Configuration information (e.g., a hierarchy of roles, number of replicas for each role, and associated startup policies) may be stored and read from the predetermined location (step 520). Based on this configuration information, the bootstrap module may select roles (step 530), e.g., by working its way down the hierarchy, and check for earlier registration entries indicating the roles have been taken (step 540). If the desired number of replicas for the role has already been filled, the next role is selected and checked.

In response to detecting that one of the roles is available, a registration entry is created for the available role and stored to the appropriate location (step 550), and the replica is configured to match the available role (step 560). Other information required such as other replicas' registration entries may be read (steps 570) along with any policies (step 574) needed to complete the replica configuration (step 578). The replica and or bootstrap module may check to ensure that policy requirements have been met (step 582), waiting (step 592) until they are met (e.g. by checking for reading subsequent additional registration entries), and then start execution of the application program (step 586).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method comprising:
   creating a plurality of replicas, and
   creating a bootstrap module for each replica of the plurality of replicas such that a plurality of bootstrap modules are created, wherein each bootstrap module of the plurality of bootstrap modules is configured to:
   (i) read from a predetermined location to check for earlier-stored registration entries, wherein the predetermined location each bootstrap module reads from is the same;
   (ii) in response to reading not more than a predetermined number of earlier-stored registration entries at the predetermined location, configure its replica in a first role and store a respective registration entry at the predetermined location; and
   (iii) in response to reading more than the predetermined number of earlier-stored registration entries at the predetermined location, configure its replica in a second role and store the respective registration entry at the predetermined location.

2. The method of claim 1, wherein the predetermined number of earlier-stored registration entries is zero, the first role is a master role, and the second role is a worker role.

3. The method of claim 2, wherein each of the plurality of bootstrap modules is the same, regardless of whether the bootstrap module's associated replica is to be configured in the worker role or the master role.

4. The method of claim 1, wherein each bootstrap module of the plurality of bootstrap modules is further configured to (i) determine how many replicas are to act in the first role and (ii) determine how many replicas are to act in the second role.

5. The method of claim 1, wherein the predetermined location includes configuration data, wherein the configuration data identifies at least how many first role replicas and second role replicas are to be created.

6. The method of claim 2, wherein the registration entry comprises metadata.

7. The method of claim 6, wherein the metadata comprises at least a network address.

8. The method of claim 2, wherein the predetermined location is a shared network directory.

9. The method of claim 8, wherein the shared network directory is named based on a per-job globally unique identifier (GUID).

10. The method of claim 2, further comprising reading a policy from the predetermined location.

11. The method of claim 2, further comprising, if one or more of the earlier-stored registration entries are present, reading an address of a master replica from the predetermined location.

12. The method of claim 2, further comprising, if one or more earlier-stored registration entries from other replicas are not present, waiting and reading network addresses of one or more workers from the predetermined location.

13. The method of claim 2, wherein the bootstrap modules are further configured to:
   (v) monitor the predetermined location for additional registration entries from other replicas.

14. The method of claim 13, further comprising:
   monitoring the plurality of replicas, and
   in response to detecting non-responsiveness of a critical number of replicas, clearing the registration entries from the predetermined location, and resetting the plurality of replicas.

15. The method of claim 2, wherein the registration entry is a semaphore.

16. The method of claim 2, wherein the registration entry is a file stored in a file system.

17. The method of claim 2, wherein the replicas are for compute or storage.

18. The method of claim 2, wherein the bootstrap modules are shell scripts configured to run on startup.

19. A method comprising:
   creating a plurality of replicas including at least a first replica and a second replica;
   creating a bootstrap module for each replica such that a plurality of bootstrap modules is created, wherein each bootstrap module of the plurality of bootstrap modules is configured to:
   (i) auto execute on startup;
   (ii) check for registration entries from other bootstrap modules of the plurality of bootstrap modules, wherein checking for registration entries comprises reading from a predetermined location for the registration entries, wherein the predetermined location is a shared location that each bootstrap module of the plurality of bootstrap modules checks for the registration entries from the other bootstrap modules;
   (iii) in response to reading not more than a predetermined number of registration entries at the predetermined location, (a) create a first replica registration entry for the first replica at the predetermined location and (b) configure the first replica to act in a master role; and
   (iv) in response to reading more than the predetermined number of registration entries at the predetermined location, (a) create a second replica registration entry for the second replica at the predetermined location and (b) configure the second replica to act in a worker role.

20. The method of claim 19, wherein each bootstrap module of the plurality of bootstrap modules is further configured to (i) determine how many replicas are to act in the worker role and (ii) determine how many replicas are to act in at least one other role different than the worker role and the master role.

* * * * *